(12) United States Patent
Johnson

(10) Patent No.: US 9,482,324 B2
(45) Date of Patent: Nov. 1, 2016

(54) TAPER LOCK APPARATUS

(71) Applicant: Thomson Industries, Amherst, NY (US)

(72) Inventor: Jeffrey G. Johnson, Carpentersville, IL (US)

(73) Assignee: Thomson Industries Inc., Amhurst, NY (US)

( * ) Notice: Subject to any disclaimer, the term of this patent is extended or adjusted under 35 U.S.C. 154(b) by 0 days.

(21) Appl. No.: 14/307,949

(22) Filed: Jun. 18, 2014

(65) Prior Publication Data

US 2015/0003906 A1    Jan. 1, 2015

Related U.S. Application Data

(60) Provisional application No. 61/841,913, filed on Jul. 1, 2013.

(51) Int. Cl.

| | |
|---|---|
| *F16H 25/12* | (2006.01) |
| *F16B 3/06* | (2006.01) |
| *F16D 1/097* | (2006.01) |
| *F16B 7/02* | (2006.01) |

(52) U.S. Cl.
CPC .............. *F16H 25/12* (2013.01); *F16B 3/06* (2013.01); *F16B 7/025* (2013.01); *F16D 1/097* (2013.01); *Y10T 403/7069* (2015.01)

(58) Field of Classification Search
None
See application file for complete search history.

(56) References Cited

U.S. PATENT DOCUMENTS

| 1,708,981 A | 4/1929 | Vickers | |
|---|---|---|---|
| 2012/0152872 A1* | 6/2012 | Didehvar | 403/343 |

FOREIGN PATENT DOCUMENTS

CN    201512620    6/2010

OTHER PUBLICATIONS

Search Report mailed on Oct. 1, 2014.
Written Opinion PCT/ISA/237 mailed on Oct. 1, 2014.

* cited by examiner

*Primary Examiner* — Victor MacArthur
(74) *Attorney, Agent, or Firm* — Dilworth & Barrese, LLP.

(57) ABSTRACT

A taper lock apparatus, including a screw defining a longitudinal axis and having a tapered end at one end thereof, the tapered end including a threaded bore extending partially along the longitudinal axis; a compression fitting having expansions, the fitting defining an internal space having an internal taper, the internal space configured to mate at least partially with the tapered end of the screw; and a retaining screw configured to mate with the threaded bore, wherein tightening of the retaining screw into the bore engages the taper end of the screw with the internal taper of the fitting forcing the expansions radially outward.

6 Claims, 8 Drawing Sheets

TAPER LOCK APPARATUS

PRIORITY

This application claims the benefit of U.S. Provisional Application No. 61/841,913, filed Jul. 1, 2013, the contents of which are incorporated herein by reference.

TECHNICAL FIELD

The present invention relates generally to linear actuators and, more particularly, to external linear powered screw actuators having a customizable interface between a screw and motor.

BACKGROUND

Linear actuators create motion in a straight line, in contrast to the circular motion of a conventional electric motor. Such actuators are designed for use where a motor drives a threaded shaft and a corresponding threaded coupled nut such that rotary motion of a control knob or handle is converted into a linear displacement via screws, gears or other similar devices. Most electro-mechanical linear actuator designs incorporate ball screws and ball nuts. The screw may be connected to a motor or manual control knob either directly or through a series of gears. Gears are typically used to allow a relatively small motor spinning at a higher rotational speed to be geared down to provide the torque necessary to spin the screw under a heavier load than the motor would otherwise be capable of driving directly.

Various methods have been attempted to interface a screw to a motor rotor that maintains axial load capacity and controls critical runout which in turn affects accuracy and repeatability of system. These prior art interface attempts include a press fit, a weld and an adhesive.

The press fit requires critical tolerance between shaft and hole which add cost and are hard to maintain in a motor shaft given the small diameter bore and long span. Press fits also applies high loads to motor bearings which may damage the bearings or affect system accuracy.

The weld requires a welded joint having similar metals and precision machined interface to ensure accuracy and runout. The welding method is labor intensive, requires specialized equipment and tooling, and must be assembled prior to motor assembly to protect motor from welding current.

The adhesive method involves adhesives that may be used to bond the screw to motor but also requires a precision interface, additional surface preparation, and cure time. The adhesive method also achieves the lowest strength and torque transmission capability.

Each of these prior art methods for attaching the screw to the motor is considered a permanent solution as once the interface is achieved, risk of system damage prevents disassembly and continued use of used components.

Unfortunately, linear actuators typically require a relatively complex interface between the screw and motor rotor, making assembly and disassembly of the system a time consuming process. In addition, typical linear actuators do not provide high levels of precision during operation.

This disclosure describes improvements over these prior art technologies.

SUMMARY

Accordingly, an object of the present disclosure is to provide an improved linear actuator and to overcome the disadvantages and problems of currently available devices.

Accordingly, there is provided a linear actuator system that is designed to transmit torque but also hold critical accuracy and runout required for power screw actuators.

Accordingly, a linear actuator according to the present disclosure includes a lock apparatus, including a screw defining a longitudinal axis and having a tapered end at one end thereof, the tapered end including a threaded bore extending partially along the longitudinal axis; a compression fitting having expansions, the fitting defining an internal space having an internal taper, the internal space configured to mate at least partially with the tapered end of the screw; and a retaining screw configured to mate with the threaded bore, wherein tightening of the retaining screw into the bore engages the taper end of the screw with the internal taper of the fitting forcing the expansions radially outward.

Accordingly, a taper lock apparatus is provided. The taper lock apparatus includes a screw having a tapered end; a compression fitting having an expandable end and a fixed end and including at least two slits positioned substantially parallel to a longitudinal axis of the fitting and extending from the expandable end toward the fixed end, the fitting defining an internal space having an internal taper extending at least partially along the longitudinal axis from the fixed end to the expandable end; and means for engaging the tapered end of the screw with the internal taper of the fitting to expand the expandable end of the fitting.

Accordingly, a linear drive motor and screw assembly is provided. The linear drive motor and screw assembly includes a linear drive motor including a motor shaft defining a bore there through along a longitudinal axis of the shaft; and a screw defining a longitudinal axis and having a tapered end at one end thereof, the tapered end including a threaded bore extending partially along the longitudinal axis.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION

Figure 1A:
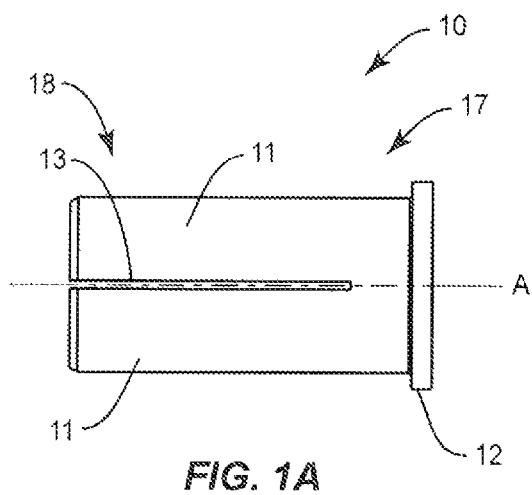
FIG. 1A is a side plan view of a compression fitting in accordance with the present disclosure.
Figure 1B:
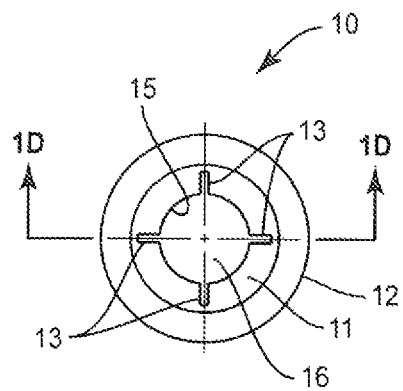
FIG. 1B is a bottom plan view of a compression fitting in accordance with the present disclosure.
Figure 1C:
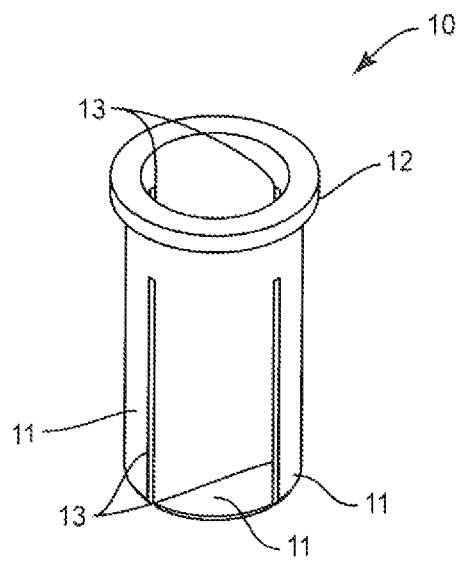
FIG. 1C is a side-top perspective view of a compression fitting in accordance with the present disclosure.
Figure 1D:
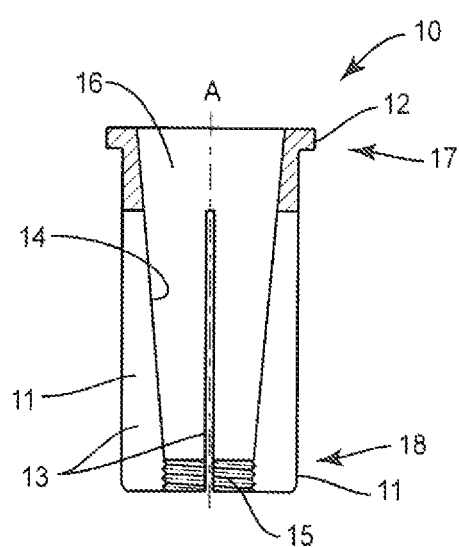
FIG. 1D is a side cross-sectional view of a compression fitting in accordance with the present disclosure.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

In order to provide an improved linear actuator and to overcome the disadvantages and problems of currently available devices, there is provided a linear actuator system that is designed to transmit torque but also hold critical accuracy and runout required for power screw actuators.

The new and novel actuator system described herein simplifies the interface between the screw and motor rotor. The motor bore is non-critical and therefore tolerances do not have to be held to ream or hone tolerances. The present disclosure allows for fast assembly and disassembly of all components to enable screws to be easily swapped based on application testing.

Simple machining of screw interface insures secure assembly and inherently achieves precise runout and concentricity. The need for a post screw straightening process is eliminated as well. In addition, assembly fixtures or tooling is not required, resulting in a faster and easier install while at the same time providing superior performance.

Taper lock joints are common methods to connect multiple power train components such as sheaves and pulleys but are intended to provide torque transmission only. Keyless bushings are similar devices but cannot be used in a linear actuator. The current disclosure is capable of torque transmission, axial load retention, radial accuracy control as well as the benefits associated with a more flexible connection interface.

As shown in FIGS. 3A-3D, the present actuator system includes a motor 30, a compression fitting 10 and a screw 20. Motor 30 defines a hollow shaft 31 there-through. Hollow shaft 31 is open at both ends of motor 30. Compression fitting 10 defines a hollow core 16 there-through. Hollow core 16 is open at both ends of fitting 10. In operation compression fitting 10 is positioned in hollow shaft 31 of motor 30. Screw 20 is positioned in hollow bore 16 of compression fitting 10. As screw 20 is inserted further into compression fitting 10, compression fitting 10 expands creating an outward radial force within hollow shaft 31 which engages compression fitting 10 with motor 30.

The hollow shaft 31 inner diameter and compression fitting 10 outer diameter are matched to a minimal slip fit condition. The inner diameter of hollow shaft 31 may be a standard though-hole tolerance with a machined surface finish. The compression fitting 10 outer diameter is preferably machine finished so that the interface enables increased friction and higher torque capability.

As shown in FIGS. 1A-1D, compression fitting 10 includes expansions 11 positioned at an expandable end 18 and a flange 12 positioned at a fixed end 17. Expansions 11 are created by at least two longitudinal slits 13 that run parallel to a longitudinal axis A of compression fitting 10, which allows this section of the diameter to expand under internal force. Slits 13 are configured to define expansions 11 that produce equal outward forces to ensure alignment of the screw 20, fitting 10 and motor 30. For example, a single slit would produce uneven outward forces and thus cause misalignment of the elements.

Compression fitting 10 includes flange 12 designed to mate with an inner race 32 of a motor radial bearing 33. This controls the depth of fitting 10 into motor 30.

Inner surface 14 of hollow core 16 is tapered inward from fixed end 17 to expandable end 18. Threads 15 are positioned at expandable end 18 of the interior of hollow core 16, and will be described in further detail below.

Figure 2A:
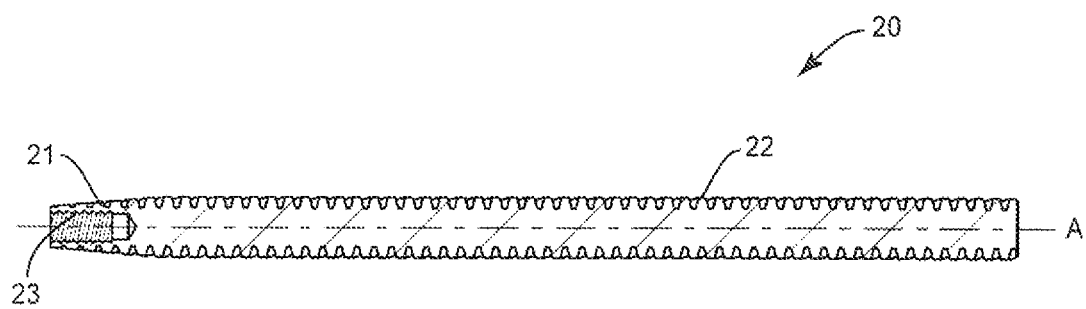
FIG. 2A is a side cross-sectional view of a screw in accordance with the present disclosure.
Figure 2B:
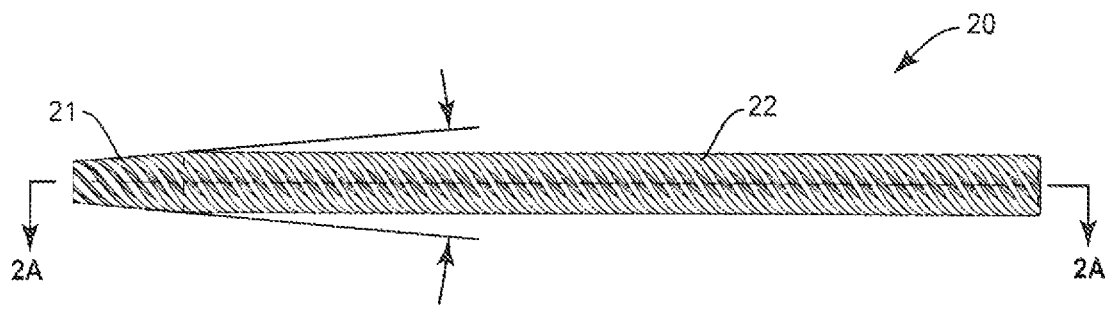
FIG. 2B is a side plan view of a screw in accordance with the present disclosure.
Figure 2C:
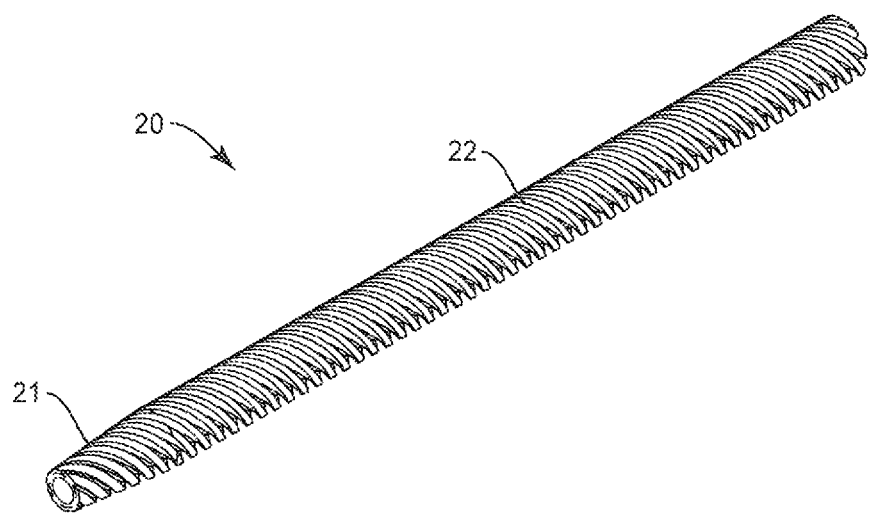
FIG. 2C is a perspective view of a screw in accordance with the present disclosure.
Figure 3A:
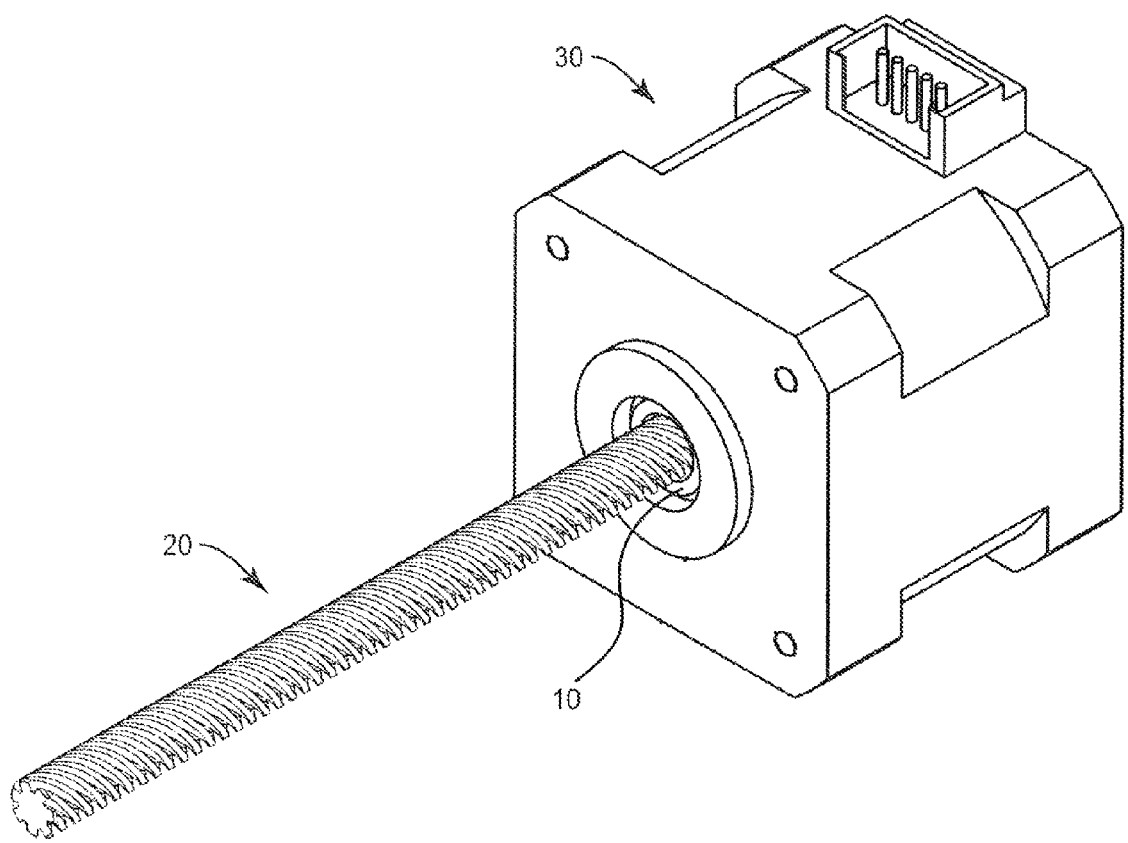
FIG. 3A is a perspective view of a taper lock apparatus system in accordance with the present disclosure.
Figure 3B:
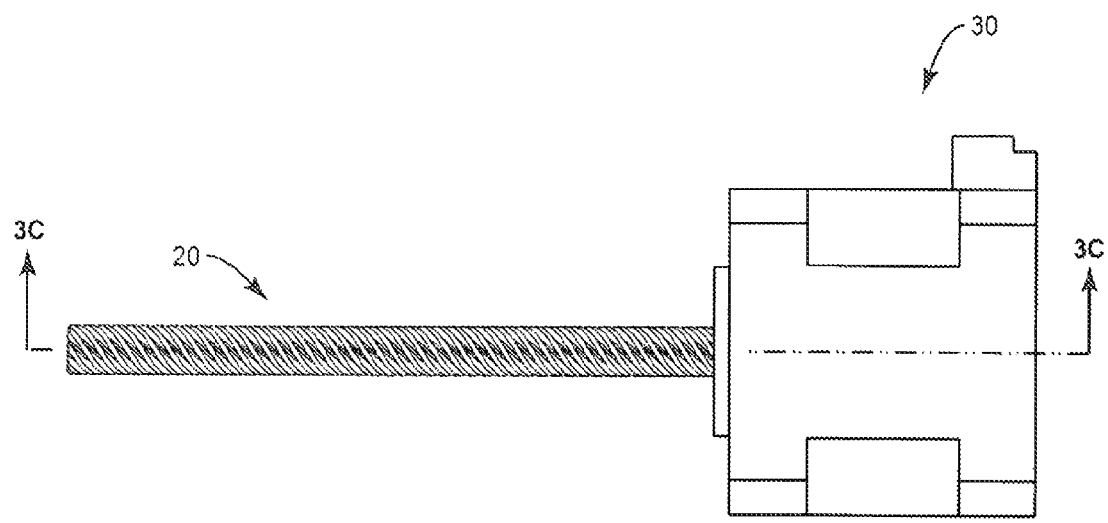
FIG. 3B is a side plan view of a taper lock apparatus system in accordance with the present disclosure.
Figure 3C:
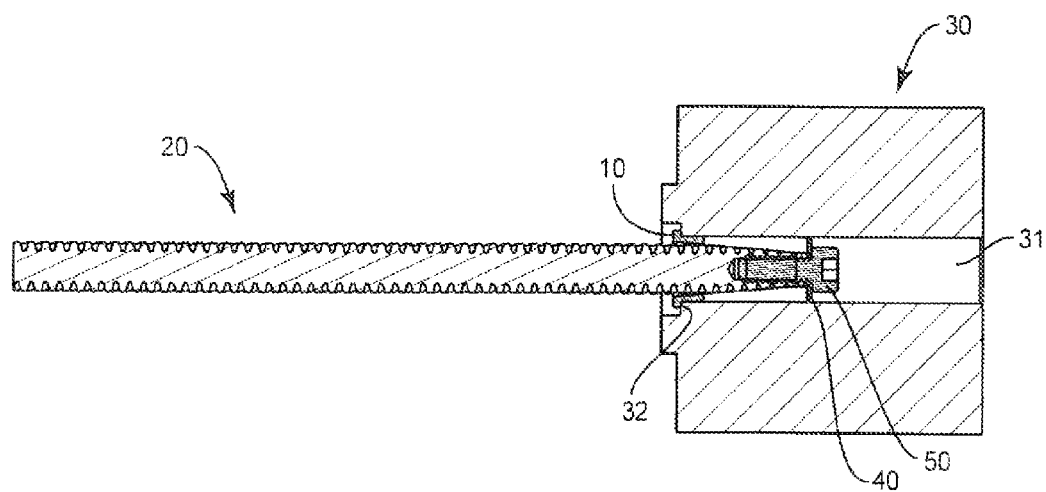
FIG. 3C is a side cross-sectional view of a taper lock apparatus system in accordance with the present disclosure.
Figure 3D:
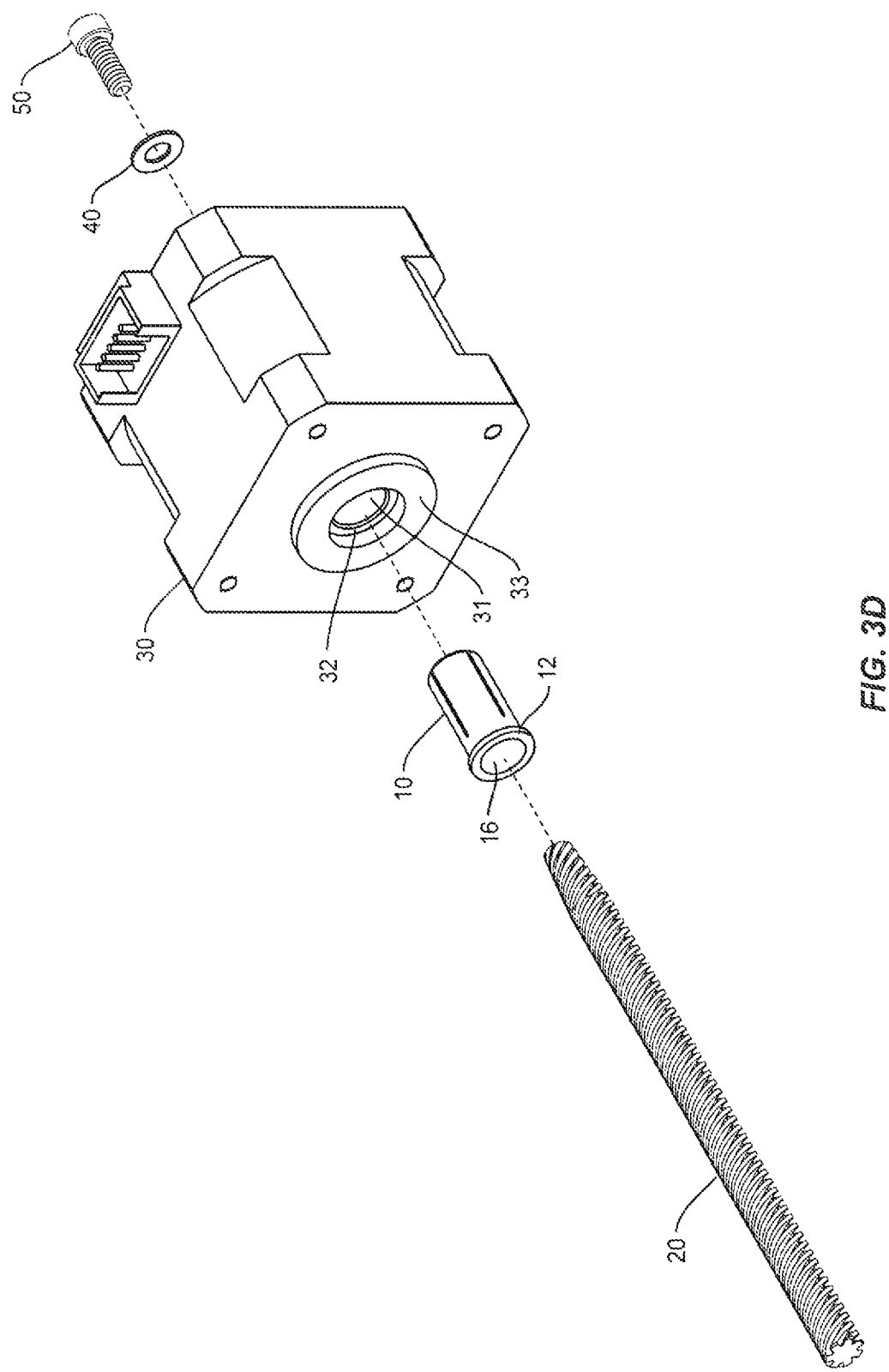
FIG. 3D is an expanded view of a taper lock apparatus system in accordance with the present disclosure.

Screw 20 is illustrated in FIGS. 2A-2C. Screw 20 includes a tapered end 21, threads 22 and bore 23. The internal surface of bore 23 is threaded. Threads 22 are configured to connect with the element to be moved by the linear actuator (not shown). The angle of tapered end 21 of screw 20 is configured to mate with the hollow core 16 taper. As stated above, the taper is used to center the screw and control concentricity and runout. The taper also allows fitting 10 to expand under a tension load. Although threads 22 are shown extending along tapered end 21, the threads are not required along this section of screw 20. For example, tapered end 21 may includes a smooth machining, grooves and/or ridges.

As described above, the expansion of fitting 10 creates an interference between the outer diameter of fitting 10 and the inner diameter of shaft 31. This interference provides the axial and torque reactionary load capability. The taper of fitting 10 and screw 20 also pulls the screw and shaft into alignment and ensures precision position of screw eliminating post assembly screw straightening.

Figure 4:
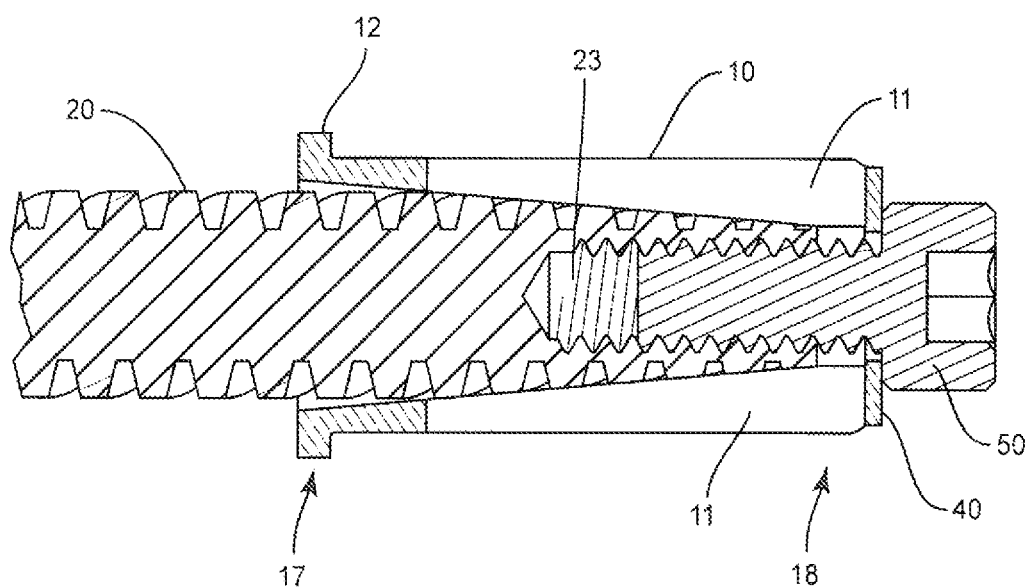
FIG. 4 is a cross-sectional view of the taper lock apparatus in accordance with the present disclosure.

In one embodiment, the tension load to expand fitting 10 is created by a washer 40 and a retaining screw 50. FIG. 4 illustrates a partial cut-away of screw 20, fitting 10, washer 40 and retaining screw 50. Screw 20 is positioned within fitting 10 through fixed end 17. Retaining screw 50 is threaded into bore 23 through expandable end 18. Retaining screw 50 is held at expandable end via washer 40, which of course is optional if the head of retaining screw 50 is large enough to avoid entering hollow core 16. As retaining screw 50 is threaded into bore 23, screw 20 is pulled into hollow core 16 wherein taper 21 engages with taper on inner surface 14. As screw 20 is further pulled into fitting 10, expansions 11 are forced radially outward and in contact with inner surface 14 of shaft 31, creating a tight mating between screw 20, fitting 10 and shaft 31.

Removal of screw 20 from fitting 10 is performed in the reverse process. That is, retaining screw 50 is unthreaded from bore 23 to release screw 20. After the pressure fit, sometimes screw 20 may become engaged with fitting 10 such that removal of retaining screw 50 is not enough to release screw 20 from fitting 10. In these cases, threads 15 are provided on inner surface of expandable end 18 of fitting 10. The diameter of fitting 10 at threads 15 is larger than the diameter of retaining screw 50 such that threads 15 do not interfere with retaining screw 50. If screw 20 is engaged with fitting 10, a removal screw (not shown) can be inserted into fitting 10 at threads 15 to push screw 20 out of fitting 10. As such, threads 15 are not required for the initial engagement of screw 20 into fitting 10 and is provided to ease removal of screw 20 from fitting 10.

Figure 5:
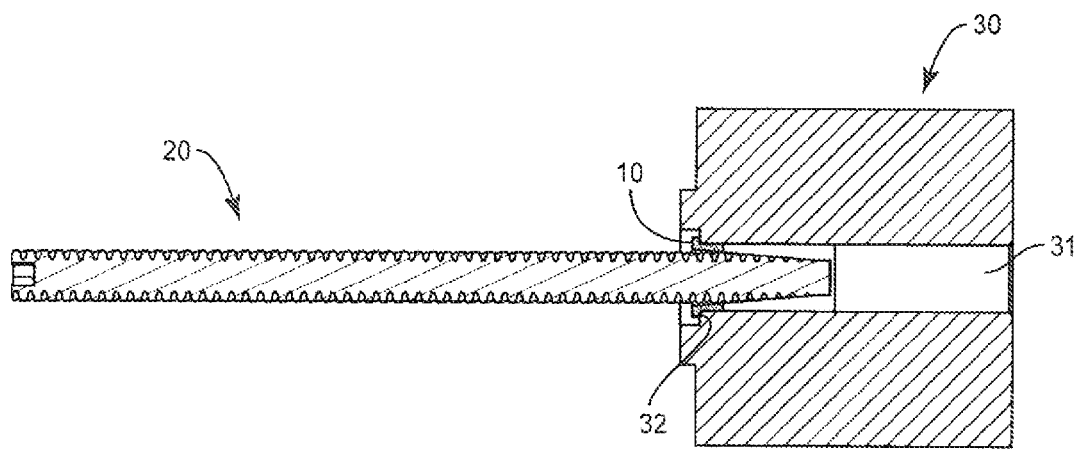
FIG. 5 is a side cross-sectional view of a taper lock apparatus system in accordance with the present disclosure.

In an alternate embodiment of the actuator system shown in FIG. 5, the hollow shaft motor is substituted with a motor with a blind hole, i.e. a shaft that does not extend completely through motor and is closed on one end, and a secondary method of tightening the screw into the fitting is provided. For example, screw 20 can be fitted with a hex drive fitting at an end opposite tapered end 21. The hex drive can be used by a hex wrench to insert screw 20 into fitting 10 in motor shaft 31.

Figure 6:
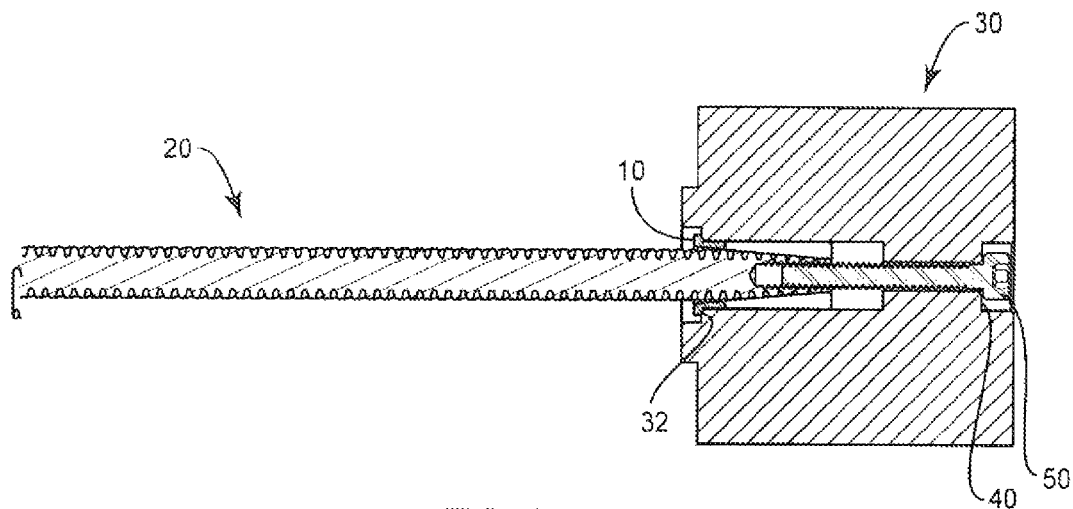
FIG. 6 is a side cross-sectional view of a taper lock apparatus system in accordance with the present disclosure.

In still another embodiment shown in FIG. 6, the motor shaft 33 is configured with an integrated tapered feature to directly interface with tapered end 21 of the screw 20. In this embodiment, shaft 33 only partially extends through motor 30. At the back end of shaft 33 an unthreaded hole is defined such that retaining screw 50 can extend there through and engage with threaded bore 23. Operation is similar to that described above.

Figure 7:
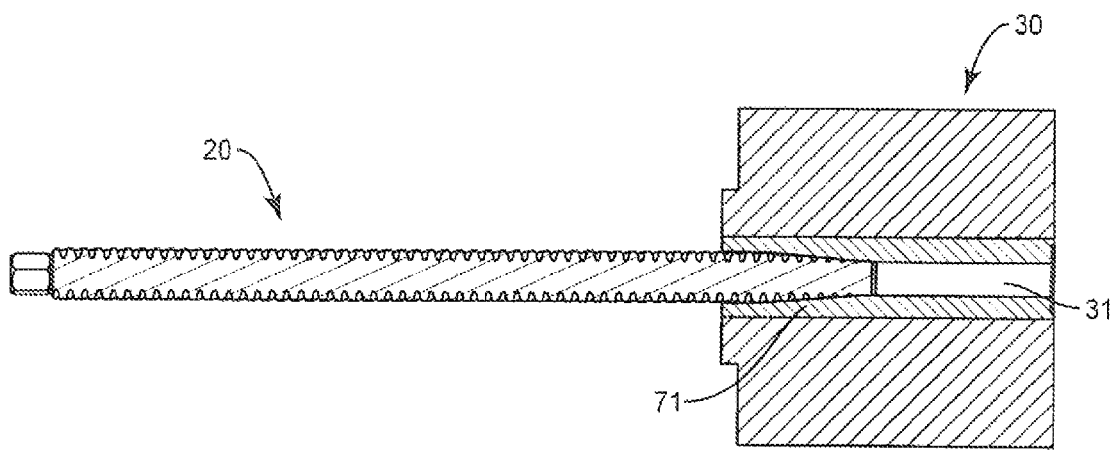
FIG. 7 is a side cross-sectional view of a taper lock apparatus system in accordance with the present disclosure.

In still yet another embodiment shown in FIG. 7, the motor shaft 33 is configured with an integrated tapered feature 71 to directly interface with tapered end 21 of the screw 20. The tapered shaft motor does not extend completely through motor and is closed on one end, and a secondary method of tightening the screw is provided. For example, screw 20 can be fitted with a hex drive fitting at the end opposite its tapered end 21. The hex drive can be used by a hex wrench to insert screw 20 into fitting 10 in motor shaft 31.

Figure 8:
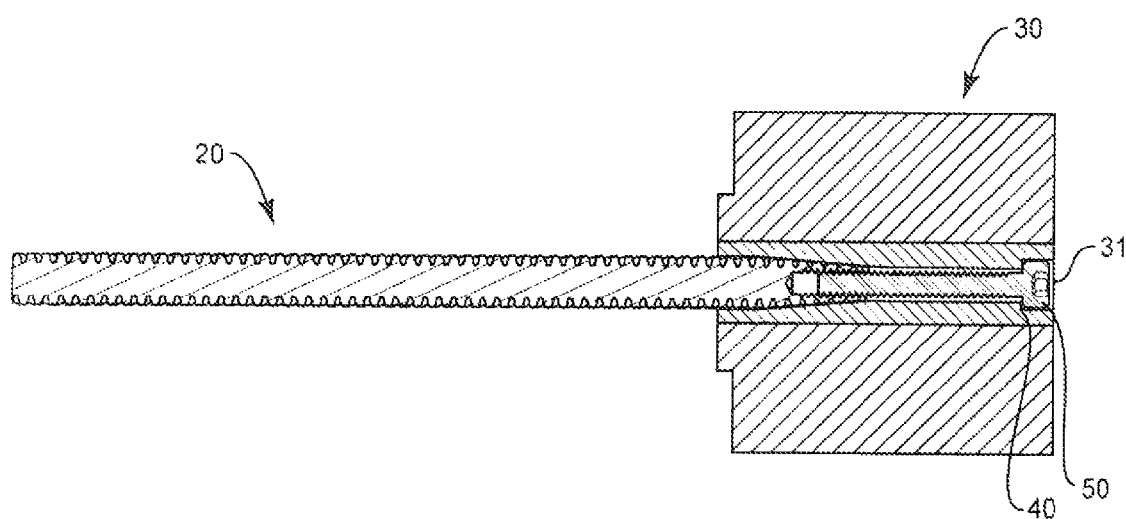
FIG. 8 is a side cross-sectional view of a taper lock apparatus system in accordance with the present disclosure.

In an embodiment shown in FIG. 8, the motor shaft 33 is configured with an integrated tapered feature 71 to directly interface with tapered end 21 of the screw 20. In this embodiment and similar to the embodiment of FIG. 6, shaft 33 only partially extends through motor 30. At the back end of shaft 33 an unthreaded hole is defined such that retaining screw 50 can extend there through and engage with threaded bore 23. Operation is similar to that described above.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and together with the detailed description, serve to explain the principles of the present invention.

The present disclosure has been described herein in connection with a linear actuator; other applications are contemplated.

Where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claim.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A taper lock apparatus, comprising:
a work screw having a tapered end;
a compression fitting having an expandable end and a fixed end and including at least two slits positioned substantially parallel to a longitudinal axis of the fitting and extending from the expandable end toward the fixed end, the fitting defining an internal space having an internal taper extending at least partially along the longitudinal axis from the fixed end to the expandable end; and
a retaining screw,
wherein the tapered end of the work screw defines a threaded bore extending partially along the longitudinal axis, the threaded bore configured to mate with the retaining screw, and the tapered end of the work screw engages with the internal taper of the fitting to expand the expandable end of the fitting.

2. A linear drive motor including the taper lock apparatus of claim 1,
wherein the linear drive motor includes a motor shaft defining a bore there through along a longitudinal axis of the shaft and configured to accept the fitting, and
wherein the fitting is secured in the bore of the motor shaft when expanded.

3. The linear drive motor of claim 2,
wherein the fitting includes a flange configured to mate with an Inner race of a radial bearing of the drive motor.

4. A taper lock apparatus, comprising:
a work screw defining a longitudinal axis and having a tapered end at one end thereof, the tapered end including a threaded bore extending partially along the longitudinal axis;
a compression fitting having expansions at an expandable end, the fitting defining an internal space having an internal taper extending from a fixed end to the expandable end, the internal space configured to mate at least partially with the tapered end of the work screw; and
a retaining screw configured to mate with the threaded bore,
wherein threads of the retaining screw are configured to pass through the expandable end of the fitting and the retaining screw is configured to provide a pulling force to the work screw by positioning the retaining screw against a distal end of the expandable end of the fitting.

5. The taper lock apparatus of claim 4, wherein the work screw engages with the fitting through the fixed end and the retaining screw engages with the work screw through the expandable end.

6. The taper lock apparatus of claim 5, wherein a tightening of the retaining screw into the bore engages the taper end of the work screw with the internal taper of the fitting forcing the expansions radially outward.

* * * * *